(12) United States Patent
Rigney

(10) Patent No.: US 8,441,748 B2
(45) Date of Patent: *May 14, 2013

(54) ADJUSTABLE OPTICAL MOUNT WITH LOCKING DEVICES AND METHODS

(75) Inventor: Thomas Rigney, Silverado, CA (US)

(73) Assignee: Newport Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,400

(22) Filed: Jun. 15, 2011

(65) Prior Publication Data

US 2011/0242687 A1     Oct. 6, 2011

Related U.S. Application Data

(62) Division of application No. 11/654,946, filed on Jan. 17, 2007, now Pat. No. 7,982,980.

(60) Provisional application No. 60/760,675, filed on Jan. 20, 2006.

(51) Int. Cl.
*G02B 7/02* (2006.01)

(52) U.S. Cl.
USPC .......................................... 359/822; 359/829

(58) Field of Classification Search .................. 359/819, 359/822, 827, 829, 702
See application file for complete search history.

(56) References Cited

U.S. PATENT DOCUMENTS

| | | | |
|---|---|---|---|
| 5,757,561 A | 5/1998 | Sechrist et al. | |
| 5,930,057 A | 7/1999 | Sechrist et al. | |
| 6,016,230 A | 1/2000 | Nunnally et al. | |
| 6,198,580 B1 | 3/2001 | Dallakian | |
| 6,614,601 B2 | 9/2003 | Dallakian | |
| 7,982,980 B2 | 7/2011 | Rigney | |
| 2006/0198035 A1 | 9/2006 | Glatter | |

OTHER PUBLICATIONS

Office Action mailed on: Mar. 17, 2011 in U.S. Appl. No. 11/654,946, filed Jan. 17, 2007 and issued as 7,892,980 on Jul. 19, 2011.
Office Action mailed on: Nov. 23, 2010 in U.S. Appl. No. 11/654,946, filed Jan. 17, 2007 and issued as 7,892,980 on Jul. 19, 2011.
Office Action mailed on: Jun. 9, 2010 in U.S. Appl. No. 11/654,946, filed Jan. 17, 2007 and issued as 7,892,980 on Jul. 19, 2011.
Office Action mailed on: Nov. 27, 2009in U.S. Appl. No. 11/654,946, filed Jan. 17, 2007 and issued as 7,892,980 on Jul. 19, 2011.
US 6,304,394, 10/2001, Sechrist et al. (withdrawn)

*Primary Examiner* — Alicia M Harrington
(74) *Attorney, Agent, or Firm* — Grant Anderson LLP

(57) ABSTRACT

An adjustable optical mount embodiment includes a first plate configured to mount an optical element and a second plate disposed adjacent the first plate with a pivot point between the plates. At least one adjustable threaded member has a contact end in contact with a rear surface of the first plate and a threaded outer surface in threaded engagement with a threaded bore of the second plate. A lock collar having a threaded bore in threaded engagement with a threaded outer surface of the adjustable threaded member which extends from a rear surface of the second plate has a torqueable surface disposed at an adjustment end which is configured to be engaged for the application of torque from a rearward position relative to the adjustable optical mount.

3 Claims, 4 Drawing Sheets

ADJUSTABLE OPTICAL MOUNT WITH LOCKING DEVICES AND METHODS

RELATED APPLICATIONS

This divisional application claims priority from U.S. Utility patent application Ser. No. 11/654,946 titled "Adjustable Optical Mount with Locking Devices and Methods", filed Jan. 17, 2007, by Thomas Rigney, which claims priority under 35 U.S.C. section 119(e) from U.S. Provisional Patent application Ser. No. 60/760,675 titled "Adjustable Optical Mount with Locking Devices and Methods", filed Jan. 20, 2006, by Thomas Rigney, both of which are incorporated by reference herein in their entirety.

BACKGROUND

Optical devices or elements such as lenses, mirrors, waveplates and the like are typically mounted to an optical system with an adjustable optical mount. An example of an optical system may include an optical bench or base having multiple optical devices and components mounted to the base with an orientation so as to provide an optical path which directs a light beam from one optical device to the next. Beams from lasers or other light sources are generally used for such applications. For such arrangements, an adjustable optical mount provides a mechanism to securely fasten an optical element to the base or other component of the optical system and still allow for some adjustment of the orientation of the optical element.

Existing adjustable optical mounts may include embodiments having a first plate configured to have an optical element secured thereto. A second plate is disposed adjacent the first plate and includes three contact points extending from the second plate to the first plate. One or more of the contact points may be disposed on the end of an adjustment shaft, such as an adjustment screw, which is threaded to the second plate. The contact points may also be disposed in a detent on the first plate which allows rotation of the contact point relative to the first plate, but prevents the contact point from sliding or being transversely displaced along the first plate. One or more retractive members, such as springs or magnets, are fastened between the first and second plates so as to force the plates to be drawn together with the restorative force of the spring, springs, magnet or magnets. The attractive force generated by the retractive members between the plates is resisted by the three contact points against the respective detents of the first plate.

In such an arrangement, rotation of an adjustment screw moves the adjustment screw relative to the second plate in order to adjust the separation between the plates at the adjustment screw position and thus the relative orientation of the first plate to the second plate. If a fine screw thread is used for the adjustment screw, fine adjustment of the orientation of the first plate and optical element can be made with respect to the second plate. The second plate is generally configured to be securely mounted to a base of an optical system with a flange, clearance hole, threaded hole or the like. Once the second plate is securely fastened to the base, the adjustable optical mount allows the optical element secured to the first plate to be secured to the base of the optical system with fine adjustment of the orientation of the optical element relative to an optical path of the optical system.

One of the shortcomings of such an arrangement is that once the adjustment screw has been adjusted to a desired position, it may be accidentally moved or otherwise knocked out of alignment as other components of the optical system are adjusted. Although some locking mechanisms are available, they tend to be complicated to use or manufacture. What has been needed is an adjustable optical mount having a locking mechanism that is easy to use and cost effective to manufacture.

SUMMARY

Some embodiments of an adjustable optical mount include a first plate configured to have an optical element secured thereto. The first plate also has a front surface and a rear surface. A second plate includes a front surface disposed adjacent the rear surface of the first plate, a rear surface, and at least one threaded bore extending therein. An adjustable threaded member has a contact end in contact with the rear surface of the first plate and an adjustment end with a torqueable surface. A threaded outer surface of the adjustable threaded member is in threaded engagement with the threaded bore of the second plate with at least a portion of the threaded outer surface extending from the rear surface of the second plate. A lock collar having a contact end and an adjustment end includes a threaded bore in threaded engagement with the threaded outer surface of the adjustable threaded member which extends from the rear surface of the second plate. The lock collar also has a torqueable surface disposed at the adjustment end. The adjustable threaded member, lock collar and threaded bore of the second plate are configured to have a greater resistance to relative rotational movement between the threaded outer surface of the adjustable threaded member and the threaded bore of the second plate than the resistance to relative rotational movement of the threaded engagement between the threaded bore of the lock collar and the threaded outer surface of the adjustable threaded member.

Some embodiments of a method of locking an adjustable optical mount include providing an adjustable optical mount. The adjustable optical mount includes a first plate which is configured to have an optical element secured thereto. The first plate also has a front surface and a rear surface. A second plate, which has a front surface disposed adjacent the rear surface of the first plate, has a rear surface and at least one threaded bore extending therein. An adjustable threaded member has a contact end in contact with the rear surface of the first plate and an adjustment end with a torqueable surface. A threaded outer surface of the adjustable threaded member is in threaded engagement with the threaded bore of the second plate with at least a portion of the threaded outer surface extending from the rear surface of the second plate. A lock collar having a contact end and an adjustment end has a threaded bore in threaded engagement with the threaded outer surface of the adjustable threaded member which extends from the rear surface of the second plate. The lock collar also has a torqueable surface disposed at the adjustment end thereof. The adjustable threaded member, lock collar and threaded bore of the second plate are configured to have a greater resistance to relative rotational movement of the threaded engagement between the threaded outer surface of the adjustable threaded member and the threaded bore of the second plate than the resistance to relative rotational movement between the threaded engagement between the threaded bore of the lock collar and the threaded outer surface of the adjustable threaded member. Once the adjustable optical mount has been provided, the torqueable surface of the lock collar is engaged from a rearward direction relative to the adjustable optical mount. Torque is then applied to the torqueable surface of the lock collar so as to rotate the lock collar relative to the adjustable threaded member without imparting relative rotational movement between the adjustable threaded member and the threaded bore of the second plate. Rotation is continued until the contact end of the lock collar makes contact with the rear surface of the second plate without significant displacement of the adjustable threaded member relative to the second plate, thereby locking rotational movement of the adjustable threaded member. In such methods, the torqueable surface of lock collar may include a female cavity configured to engage a hexagonal wrench and torque is applied to the torqueable surface by engaging the torqueable surface with a hexagonal wrench and applying torque to the hexagonal wrench.

Some embodiments of a lock collar for locking an adjustable threaded member of an adjustable optical mount include a barrel shaped body portion having a contact end, an adjustment end and a threaded bore configured for threaded engagement with a threaded outer surface of the adjustable threaded member. The body portion of the lock collar has a torqueable surface disposed at the adjustment end and includes a female cavity having a substantially hexagonal shaped transverse cross section and an inner transverse dimension larger than an outer transverse dimension of the adjustable threaded member.

These features of embodiments will become more apparent from the following detailed description when taken in conjunction with the accompanying exemplary drawings.

DETAILED DESCRIPTION

Figure 1:
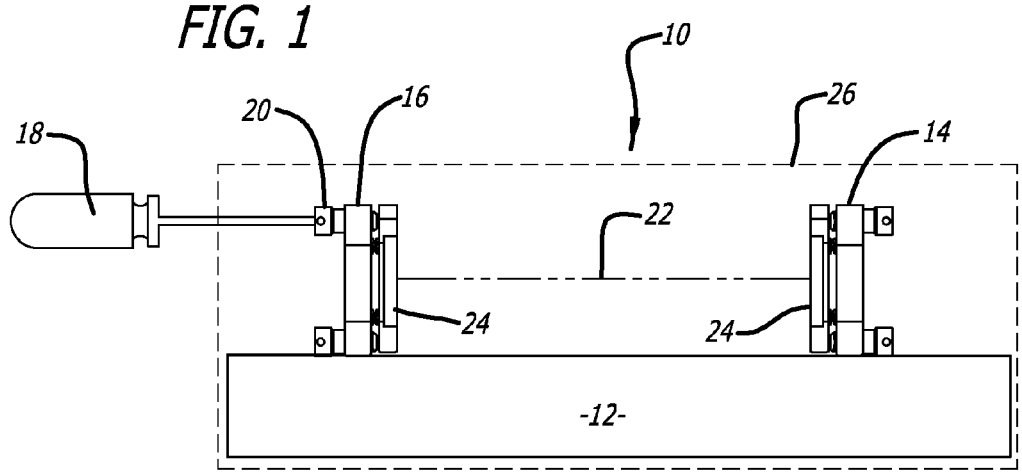
FIG. 1 is an elevational view of an optical system embodiment which includes a base portion, a first adjustable optical mount secured to the base portion, a second adjustable optical mount secured to the base portion opposite the first adjustable optical mount and an adjustment tool engaged with a lock collar of the second adjustable optical mount from a rearward position relative to the second adjustable optical mount.

As discussed above, optical devices or elements such as lenses, mirrors, waveplates and the like are typically mounted to an optical system with an adjustable optical mount. FIG. 1 is an elevational view of an optical system embodiment 10 which includes a base portion 12, a first adjustable optical mount 14 secured to the base portion 12 and a second adjustable optical mount 16 secured to the base portion 12 opposite the first adjustable optical mount 14. An adjustment tool 18 is engaged with a lock collar 20 of the second adjustable optical mount 16 from a rearward position relative to the second adjustable optical mount 16. The first adjustable optical mount 14 and second adjustable optical mount 16 are facing each other in a configuration that allows for them to be adjusted so as to form an optical axis 22 between optical elements 24, such as mirrors, secured in the adjustable optical mounts 14 and 16.

The optical system embodiment 10, shown in FIG. 1 for illustrative purposes, may be useful for forming a lasing cavity along the optical axis 22 of the system. An enclosure, indicated by dashed line 26 is representative of an optional housing for such an embodiment of a lasing cavity. For this type of embodiment, as well as others, the configuration of the adjustable optical mounts 14 and 16 which allows for adjustment access from a position rearward of the adjustable optical mounts 14 and 16, may be useful in making adjustments to optical elements disposed therein without interfering with the optical path or axis 22 during the adjustment. Such access may also be useful where an enclosure 26 provides limited access to the adjustable optical mounts 14 and 16.

FIGS. 2-5 illustrate the adjustable optical mount 16 in more detail and without an optical element 24 disposed therein. A first plate 28 is configured to have an optical element 24 secured thereto and has a front surface 30 and a rear surface 32. A second plate 34 has a front surface 36 disposed adjacent the rear surface 32 of the first plate 28 and a rear surface 38. The first plate 28 has a cavity 40 that is configured to releasably secure an optical element 24 such as a mirror, lens, waveplate, filter, prism or the like. The cavity 40 is shown in the form of a partial circular bore and includes a locking mechanism in the form of a lock screw 42 which is threadingly engaged with the first plate 28 and configured to impinge on the cavity 40 when screwed into the first plate 28. Optionally, the cavity 40 may form any variety of configuration sized and configured to receive at least one optical component therein. The first plate 28 and second plate 34 may be made from high strength, lightweight, materials such as aluminum, composites or the like.

Figure 3:
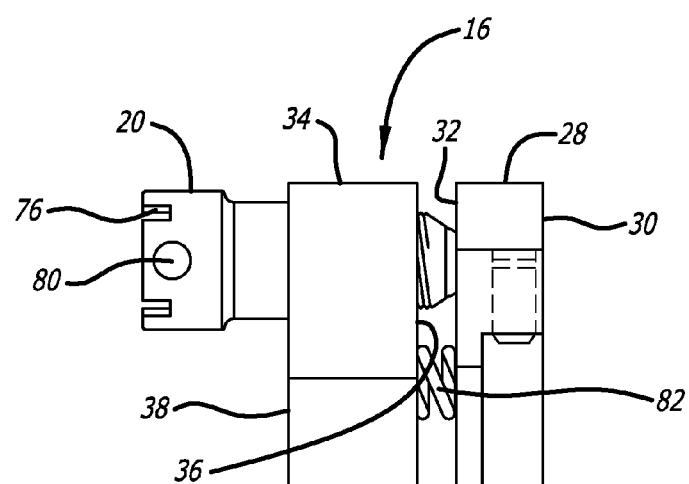
FIG. 3 is an elevational side view of the adjustable optical mount of FIG. 2.
Figure 2:
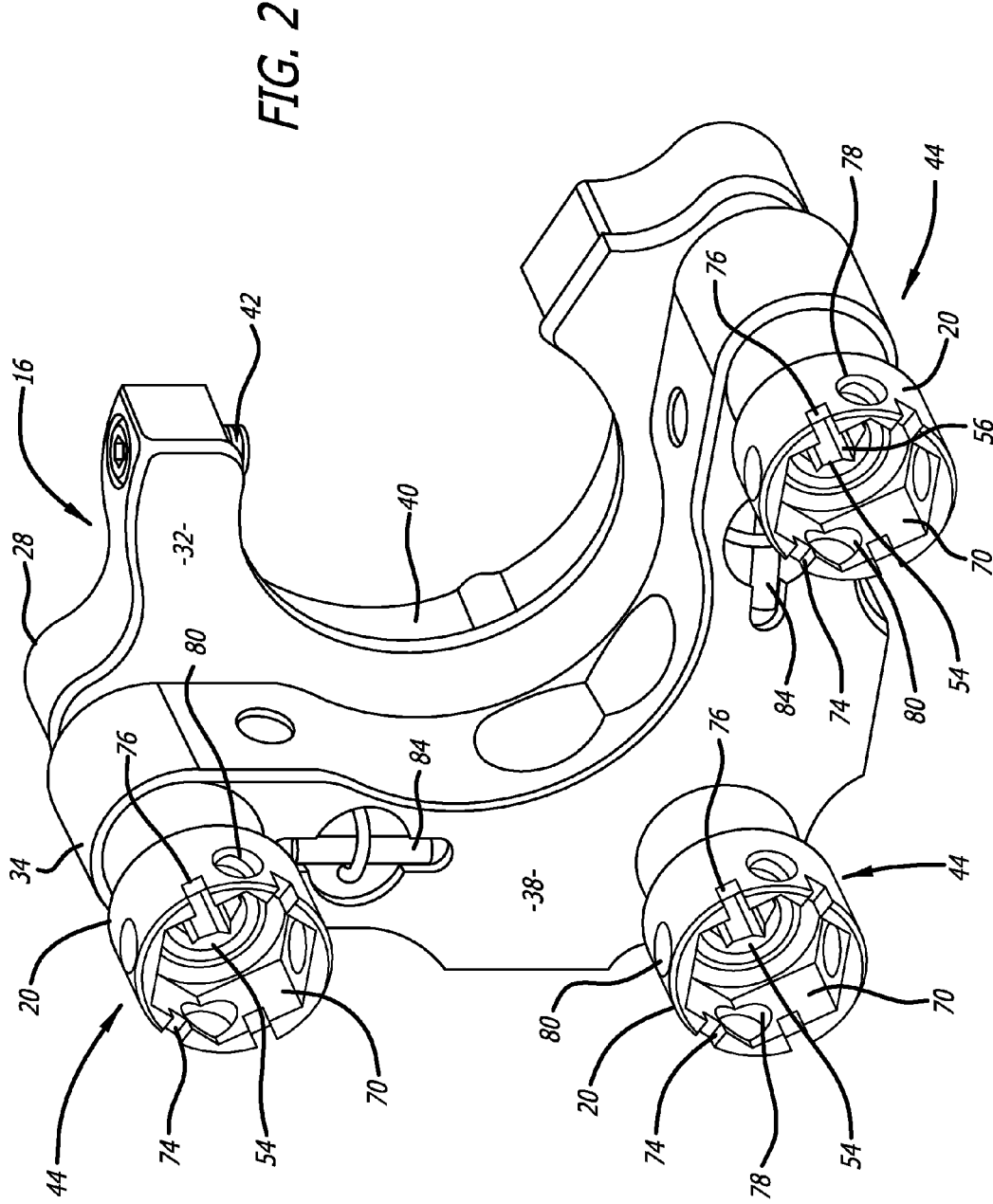
FIG. 2 is a perspective view of an adjustable optical mount embodiment.

Adjustment mechanisms 44 which are configured to allow an adjustment of relative orientation between the two plates 28 and 34 include a threaded bore 46, as shown in FIG. 3, extending from the front surface 36 of the second plate 34 to the rear surface 38 of the second plate 34. The adjustment mechanism 44 also includes an adjustable threaded member 48 which has a contact end 50 in contact with a detent 52 disposed in the rear surface 32 of the first plate 28, an adjustment end 54 with a torqueable surface 56 and a threaded outer surface 58. The threaded outer surface 58 is in threaded engagement with the threaded bore 46 of the second plate 34 with at least a portion of the threaded outer surface 58 extending rearwardly from the rear surface 38 of the second plate 34. A spherical bearing 60 is disposed at or otherwise secured to the contact end 50 of the adjustable threaded member 48 and engages the detent 52 so as to allow for angular movement of the spherical bearing 60 relative to the detent 52, but whereby transverse movement or displacement of the spherical bearing 60 relative to the rear surface 32 of the first plate 28 is prevented by the detent 52.

The torqueable surface 56 of the adjustable threaded member 48 disposed at the adjustment end 54 thereof may include a female cavity 62 having a substantially hexagonal transverse cross section or any other suitable configuration that allows rotation and adjustment of the adjustable threaded member 48 without imparting large amounts of axial force on the adjustable threaded member 48 relative to the rotational force being applied. For example, if a female cavity 62 having a substantially hexagonal transverse cross section in used, a hexagonal wrench, such as an Allen® wrench or driver may be used to adjust the adjustable threaded member 48 by rotation thereof without imparting significant axial force on the adjustable threaded member 48. Other configurations may also be used. For example, a female cavity 62 having a substantially star-shaped configuration may be engaged with a Torx® style tool. This type of adjustment tool embodiments allow for solid mechanical coupling of the adjustment tool to the adjustable threaded member 48 on a torqueable surface 56 which is smaller in transverse cross section than the outer transverse dimension of the threaded outer surface 58 of the adjustable threaded member 48.

Any one of the adjustment mechanisms 44 shown may function as a fixed pivot point for the first plate 28 relative to the second plate 34 if the adjustable threaded member 48 of the adjustment mechanism 44 remains in a fixed or constant position. In other embodiments, pivot points may be used wherein fixed contact points extend from the front surface 36 of the second plate and contact the rear surface 32 of the first plate 28. For such embodiments, a permanent shaft having an optional spherical bearing or other radiussed or pointed contact point may be used. Adjustable optical mount embodiment 16 may have three contact points in a non-linear or triangular arrangement as shown, at least one of which is provided by an adjustment mechanism 44.

The adjustment mechanisms 44 shown also include a locking mechanism in the form of lock collar 20 having a substantially barrel-shaped body section with a contact end 64, an adjustment end 66 and a threaded bore 68 in threaded engagement with the threaded outer surface 58 of the adjustable threaded member 48. In particular, the threaded bore 68 of the lock collar 20 is in threaded engagement with the portion of the threaded outer surface 58 of the adjustable threaded member 48 which extends rearwardly from the rear surface 38 of the second plate 34. The lock collar 20 also includes a torqueable surface 70 in the form of a female cavity 72 having a substantially hexagonal transverse cross section disposed at the adjustment end 66. The inner transverse dimension of the female cavity 72 is larger than an outer transverse dimension of the adjustable threaded member 48 and torqueable surface 56 thereof. Such a hexagonal cavity 72 may be coupled to the hexagonal tip of a hexagonal wrench, such as an Allen® wrench. A Torx® style configuration or any other suitable configuration may also be used so as to allow for adjustment and locking of the lock collar 20 by an adjustment tool 18 as shown in FIG. 1.

In addition to the hexagonal female cavity 72, the lock collar 20 includes another embodiment of torqueable surfaces 74 formed from optional transverse slots 76 cut in a diametrically opposed radial orientation at the adjustment end 66 of the lock collar 20. Such transverse slots 76 produce circumferentially oriented surfaces 74 that may be engaged with a thin flat blade, such as the blade of a flat screwdriver tip. The circumferentially oriented surfaces 74 also allow torque or rotation to be applied to the lock collar 20 without substantial axial force being applied from a position rearward of the adjustable optical mount 16. Also, the lock collar 20 also includes other embodiments of torqueable surfaces 78 formed by diametrically opposed transverse holes 80 through a wall portion of the lock collar 20 in an adjustment portion 82 of the lock collar 20 adjacent the hexagonal cavity 72. The transverse holes 80 allow a thin elongate adjustment tool or pin to be inserted through a pair of opposed holes 80 and rotate the adjustment to impart torque or rotation on the lock collar 20 without imparting significant axial force on the lock collar 20. This method, however, requires access to the lock collar 20 from a lateral position rather than from a position rearward of the adjustable optical mount 16.

Although any number of suitable type torque surface and adjustment tool configurations may be used for the lock collar 20, it may be useful for some embodiments to use an Allen® style hexagonal configuration as these types of tools are generally readily available in most optics laboratories. The same holds true for the torqueable surface 56 of the adjustable threaded member 48 discussed above. The contact end 64 of the lock collar 20 faces the rear surface 38 of the second plate 34 and is configured to press against the rear surface 38 when the lock collar 20 is rotated relative to the threaded outer surface 58 of the adjustable threaded member 48 so as to translate the lock collar 20 along the adjustable threaded member 48 towards the rear surface 38.

Retractive members in the form of springs 82 are stretched between the first plate 28 and second plate 34 to provide a force between the two plates 28 and 34 that pulls or draws the plates together with the restorative force of the spring or springs 82 in an orientation substantially perpendicular to the surfaces 30, 32, 36 and 38 of the plates 28 and 34 respectively. The attractive force generated by the springs 82 between the plates 28 and 34 is resisted by the three contact ends 50 pressed against the respective detents 52 of the rear surface 32 of the first plate 28. The ends of springs 82 are secured the plates 28 and 34 by passing loop ends of the springs 82 through holes in the plates 28 and 34 and securing the loop ends to the plates 28 and 34 with retainer pins 84 which extend through the loop ends and mechanically capture the loop ends of the springs 82.

In such an arrangement, rotation of the adjustable threaded members 48 translates the adjustable threaded member 48 relative to the second plate 34 in a direction substantially perpendicular to the second plate 34. This translation adjusts the separation between the plates 28 and 34 at the position of the contact end 50 of the adjustable threaded member 48 being rotated and translated, and thus adjusts the relative orientation of the first plate 28 to the second plate 34. If a fine screw thread is used for the outer surface 58 of the threaded adjustable member 48, fine adjustment of the orientation of the first plate 28 and an optical element 24 secured thereto can be made with respect to the second plate 34. For some embodiments, the outer threaded surface 58 of the adjustable threaded member 48 and threaded bore 46 of the second plate 34 may have a thread pitch of about 80 threads per inch to about 120 threads per inch. For some embodiments, the outer threaded surface 58 of the adjustable threaded member 48 and threaded bore 46 of the second plate 34 may have a thread pitch of at least about 40 threads per inch.

Figure 4:
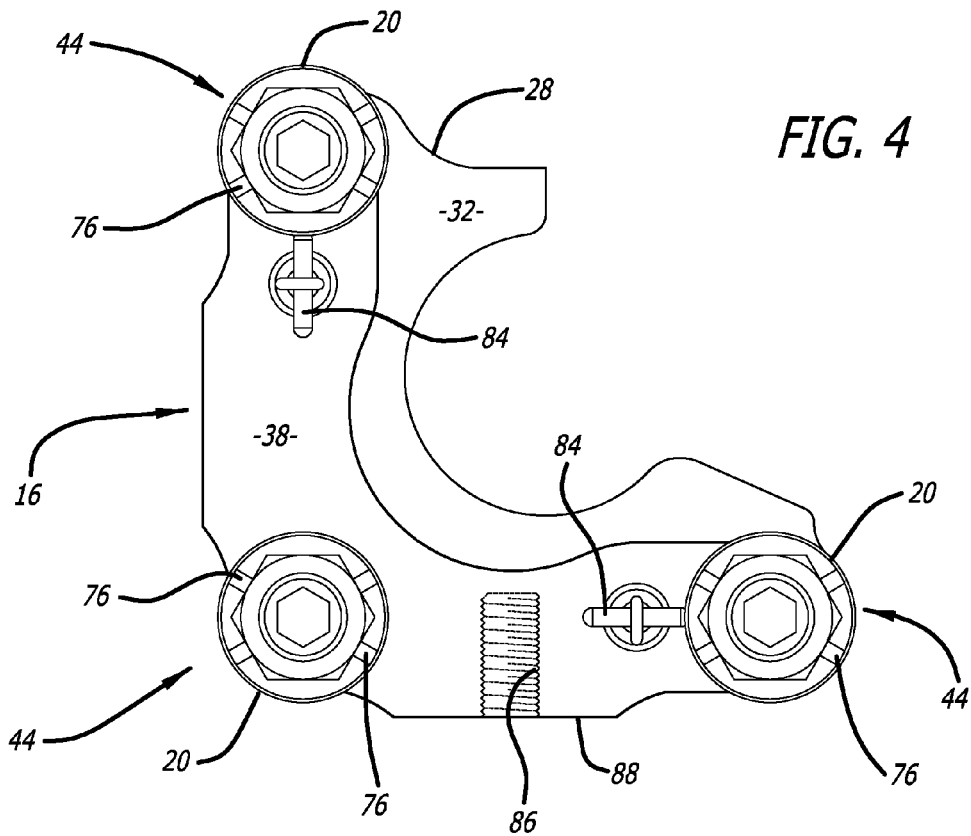
FIG. 4 is an elevational view from a rearward position of the adjustable optical mount of FIG. 2.

The second plate 34 is generally configured to be securely mounted to a base 12 of an optical system 10, as shown in FIG. 1, with a flange, threaded hole or the like. FIG. 4 illustrates a threaded bore 86 in a bottom portion 88 of second plate 34 which may be used for securing the second plate 34 to a base 12 or the like, or may be used to secure a mounting flange (not shown) to the second plate 34, which may then be mounted to a base or other piece of optical equipment. Once the second plate 34 is securely fastened to the base 12, the adjustable optical mount 16 allows an optical element 24 secured to the first plate 28, as shown in FIG. 1, to be secured to the base 12 of the optical system 10 with fine adjustment of the orientation of the optical element 24 relative to an optical path 22 of the optical system 10.

Figure 5:
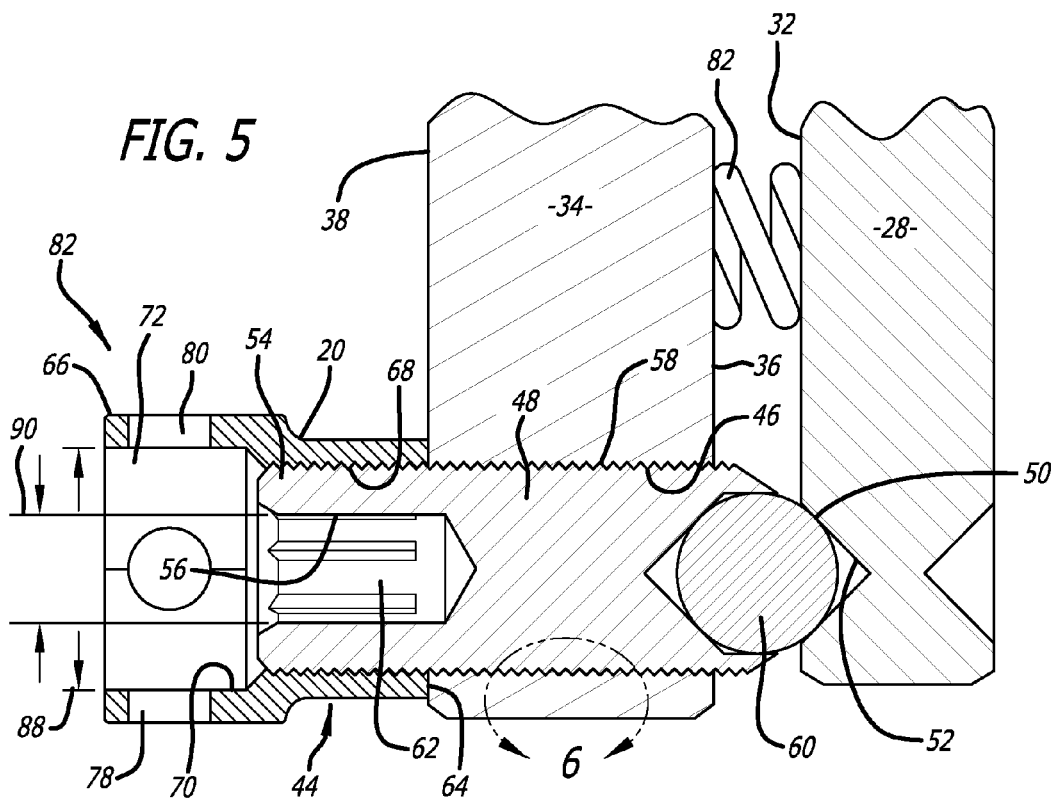
FIG. 5 is an enlarged view in section of the encircled portion of the adjustable optical mount shown in FIG. 3.

Referring to FIG. 5, the substantially concentric engagement and relative configurations of the threaded bore 68, adjustable threaded member 48 and lock collar 20 can be seen. The inner transverse dimension of the torqueable surface 70 of the lock collar 20, as shown by arrows 88, is greater than an inner transverse dimension of the torqueable surface 56 disposed at the adjustment end 54 of the adjustable threaded member 48, as shown by arrows 90. In this configuration, rotational adjustment of the adjustable threaded member 48 may be made with an adjustment tool, such as a hexagonal wrench 18, that does not interfere with or otherwise engage the torqueable surface 70 of the lock collar 20. Also, the torqueable surface 70 of the lock collar 20 extends rearwardly beyond the adjustment end 54 or extremity of the adjustable threaded member 48 so that an adjustment tool 18 may engage the torqueable surface 70 of the lock collar 20 and apply torque to the lock collar 20 without contacting or otherwise interfering with the adjustable threaded member 48.

In some embodiments, the resistance to relative rotation of the threaded engagement between the threaded bore 68 of the second plate 28 and the outer threaded surface 58 of the adjustable threaded member 48 is configured to be greater than the resistance to relative rotation of the threaded engagement between the outer threaded surface 58 of adjustable threaded member 48 and the threaded bore 68 of the lock collar 20. This allows the contact surface 64 of the lock collar 20 to be tightened against the rear surface 38 of the second plate 34 by rotation of adjustment tool 18 or manual rotation without disturbing the angular position of the adjustable threaded member 48.

For some embodiments, the threaded engagement between the threaded outer surface 58 of the adjustable threaded member 48 and the threaded bore 46 of the second plate 34 is configured to have a substantially tight fit, for example, some embodiments may use a class 3 fit here. Such a tight threaded engagement, may also include a lubricant, such as a low vapor pressure grease such as Krytox® manufactured by DuPont Company, in Wilmington, Del. or the like. The threaded engagement between the threaded inner bore 68 of the lock collar 20 and the threaded outer surface 58 of the adjustable threaded member 48 for such embodiments may have a looser fit as compared with the fit between the adjustable threaded member 48 and the threaded bore 46. For example, some embodiments may incorporate a class 2 fit for the threaded engagement between the threaded inner bore 68 of the lock collar 20 and the threaded outer surface 58 of the adjustable threaded member 48. Such a configuration may also be enhanced by manufacturing the lock collar 20, or at least an inner surface or portion thereof, from a smooth self-lubricating material such as brass, lubricant-soaked silicon aluminum bronze, Teflon® impregnated plastics, or other lubricant soaked sintered materials, or the like. It may also be useful to manufacture the threaded outer surface 58 of the adjustable threaded member 48 from a material that differs from the material of the threaded bore 68 of the lock collar 20. This may prevent galling of the two parts, particularly if both parts are made from metal.

Figure 6:
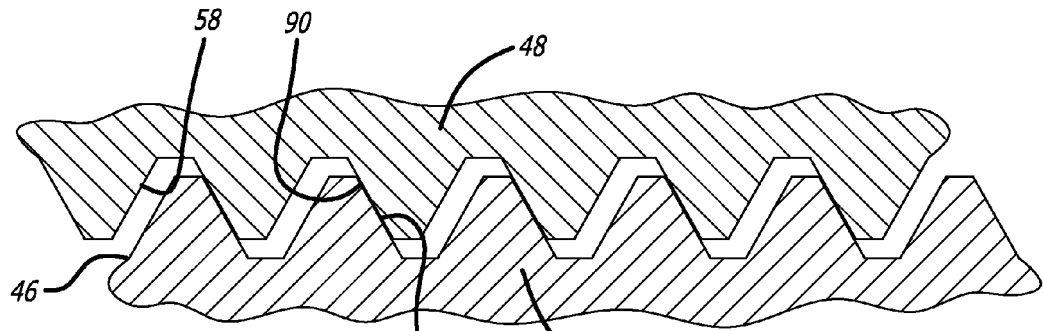
FIG. 6 is an enlarged view of the encircled portion of FIG. 5 illustrating an engagement of a threaded outer surface of an adjustable threaded member with a threaded bore of a second plate of the adjustable optical mount.

The configuration of the locking mechanism 44 shown in detail in FIG. 5 also allows for locking or fixation of rotational movement of the adjustable threaded member 48 without substantial movement of the adjustable threaded member 48 relative to the second plate 34. That is, rotation and locking of the contact end 64 of the lock collar 20 does not introduce substantial forward or backward translation of the engaged threads between the outer threaded surface 58 of the adjustable threaded member 48 and the threaded bore 46 of the second plate 34. FIG. 6 is an enlarged view of the encircled portion of FIG. 5 illustrating an engagement of a threaded outer surface 58 of the adjustable threaded member 48 with the threaded bore 46 of a second plate 34 of the adjustable optical mount 16. The threads are engaged such that a rear facing surface 90 of the threaded outer surface 58 of the adjustable threaded member 48 is pressed against or otherwise engaged with a forward facing surface 92 of the threaded bore 46 of the second plate 34. This engagement is generated continuously by the retractive bias produced by the springs 82 pulling the first plate 28 and second plate 34 together against the contact points 50 of the adjustable threaded members 48. When the contact surface 64 of the lock collar 20 is tightened against the rear surface 38 of the second plate 34 by rotation of the lock collar 20, this thread engagement remains substantially static with no significant translation or relative backlash imparted to the thread engagement.

Figures 7A, 7B:
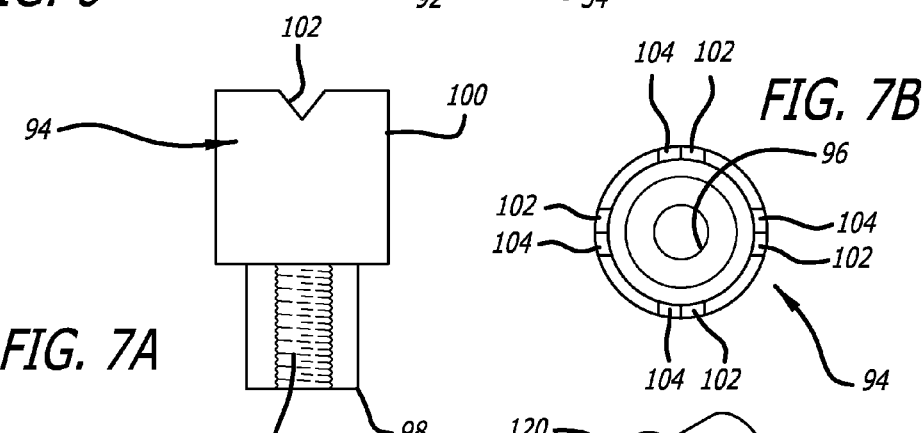
FIGS. 7A and 7B illustrate an embodiment of a lock collar.

FIGS. 7A-9B illustrate various embodiments of lock collars that may be used with the adjustment mechanisms 35 discussed above. Some of the features, dimensions and materials of the lock collar embodiments shown in FIGS. 7A-9B may be the same as or similar to the features, dimensions and materials of lock collar 20 discussed above. FIGS. 7A and 7B illustrate an embodiment of a lock collar 94 having a threaded bore 96, a contact end 98 and an adjustment end 100. The adjustment end 100 includes two pairs of diametrically opposed radially oriented wedge shaped cuts 102 which produces torqueable surfaces 104 configured for the application of rotation or torque by an appropriate adjustment device. Such an appropriate adjustment device, such as a Phillips® head screwdriver, may be engaged with the torqueable surfaces 104 from a rearward position with respect to the lock collar 94 and an adjustable optical mount 16 that the lock collar 94 may be disposed on.

Figure 8:
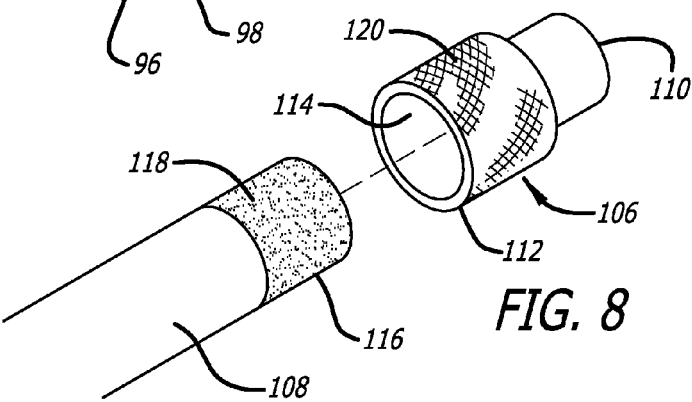
FIG. 8 illustrates an embodiment of a lock collar and adjustment tool.

FIG. 8 illustrates an embodiment of a lock collar 106 and adjustment tool 108. The lock collar 106 includes a contact end 110, an adjustment end 112 and a threaded bore (not shown) extending rearwardly from the contact end 110. The adjustment end 112 has a first torqueable surface 114 on an inner bore of the lock collar 106. The first torqueable surface 114 may be a smooth or rough surface configured to be engaged with an engagement tip 116 of the adjustment tool 108 that is made of or coated with a high friction material 118, such as a soft elastomeric-like material, that will apply torque or rotation to the lock collar 106 by virtue of the friction generated by the soft material against the torqueable surface 114. Materials such as rubber, wood, plastic, magnetic materials, polymeric materials, urethanes, and the like may be used for the high friction material 118. A second torqueable surface 120 is disposed on an outer surface of the adjustment end 112 of the lock collar 106 that has a knurled configuration, which is suitable for manual application of torque or rotation by the fingers of a user.

Figures 9A, 9B:
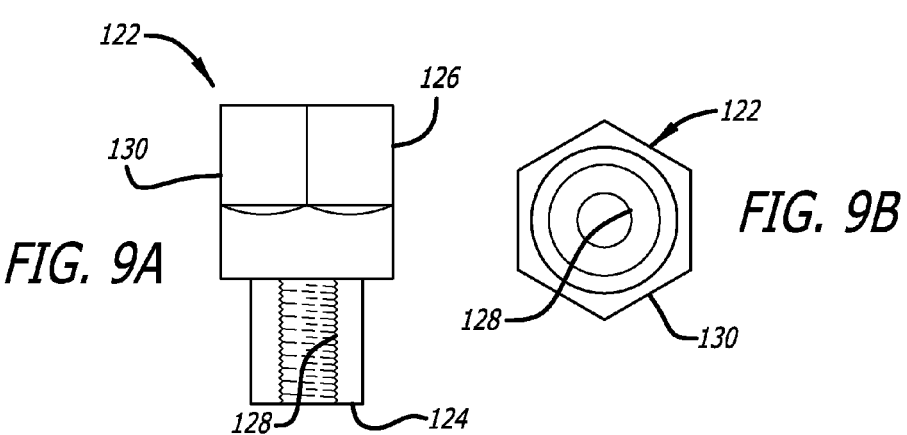
FIGS. 9A and 9B illustrate an embodiment of a lock collar.

FIGS. 9A and 9B illustrate a lock collar 122 having a contact end 124, an adjustment end 126 and a threaded bore 128 extending rearwardly from the contact end 124. A torqueable surface 130 is disposed on an outer surface of the adjustment end 126 of the lock collar 122 and includes a male form having a substantially hexagonal transverse cross section. Such a torqueable surface 130 may be engaged with a common tool such as a hexagonal socket wrench, adjustable wrench or the like. If a hexagonal socket wrench is used, access to the lock collar 122 may achieved from a position rearward of the lock collar 122 and an adjustable optical mount 16 upon which the lock collar 122 is used.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. A method of locking an adjustable optical mount, comprising:
   providing an adjustable optical mount, including
   a first plate configured to mount an optical element and having a front surface and a rear surface,
   a second plate which has a front surface disposed adjacent the rear surface of the first plate, a rear surface and at least one threaded bore,
   at least one adjustable threaded member having a contact end in contact with the rear surface of the first plate, an adjustment end with a torqueable surface and a threaded outer surface in threaded engagement with the threaded bore of the second plate with at least a portion of the threaded outer surface extending from the rear surface of the second plate,
   a lock collar having a contact end, an adjustment end, a threaded bore in threaded engagement with the threaded outer surface of the adjustable threaded member which extends from the rear surface of the second plate and having a torqueable surface disposed at the adjustment end; and
   a greater resistance to relative rotational movement of the threaded engagement between the threaded outer surface of the adjustable threaded member and the threaded bore of the second plate than the resistance to relative rotational movement of the threaded engagement between the threaded bore of the lock collar and the threaded outer surface of the adjustable threaded member;
   engaging the torqueable surface of the lock collar from a rearward direction relative to the adjustable optical mount; and
   applying torque to the torqueable surface of the lock collar and rotating the lock collar relative to the adjustable threaded member without imparting relative rotational movement between the adjustable threaded member and the threaded bore of the second plate until the contact end of the lock collar makes contact with the rear surface of the second plate without significant displacement of the adjustable threaded member relative to the second plate.

2. The method of claim 1 wherein torqueable surface of lock collar comprises a female cavity configured to engage a hexagonal wrench and wherein applying torque to the torqueable surface comprises engaging the torqueable surface with a hexagonal wrench and applying torque to the hexagonal wrench.

3. A lock collar for locking an adjustable threaded member of an adjustable optical mount, comprising: a barrel shaped body portion having a contact end, an adjustment end, a threaded bore configured for threaded engagement with a threaded outer surface of the adjustable threaded member and having a torqueable surface disposed at the adjustment end wherein the torqueable surface comprises a female cavity having a substantially hexagonal shaped transverse cross section and an inner transverse dimension larger than an outer transverse dimension of the adjustable threaded member.

* * * * *